Patented Nov. 17, 1953

2,659,714

UNITED STATES PATENT OFFICE 2,659,714

ALLYL-TYPE PHOSPHINATES AND POLYMERS OF THE SAME

Denham Harman, Orinda, and Alan R. Stiles, Berkeley, Calif., assignors to Shell Development Company, Emeryville, Calif., a corporation of Delaware No Drawing. Application March 24, 1951,
Serial No. 217,396

16 Claims. (Cl. 260—78.5)

This invention relates to new polymerizable phosphorus-containing organic compounds and to the novel polymers of the same. More particularly, the present invention relates to new, polymerizable esters of phosphinic acids and to the novel polymers of such esters, and to methods for producing the novel products of the invention.

There are known certain polymerizable unsaturated esters of organic acids of phosphorus, such as the diolefinic diesters diallyl benzenephosphonate and dimethallyl toluenephosphonate, and there are also known certain more highly unsaturated esters of organic acids of phosphorus, such as diallyl isobutenylphosphonate and dimethallyl isooctenylphosphate. Insofar as we know, there have been known prior to this invention only few, if any, instances in which polymers have been successfully prepared from monoolefinically unsaturated compounds of the organic acids of phosphorus. U. S. 2,439,214 to Lindsey shows that certain alpha,beta-ethylenically unsaturated phosphinic acids, esters and amides can be polymerized under special conditions, but in each case only resinous copolymers with certain other ethylenically unsaturated compounds are described. Insofar as we know, there has been reported in the art prior to this invention no instance in which polymers having practical value have been prepared from a monoester of an olefinically unsaturated alcohol and a monobasic organic acid of phosphorus. As used in the present specification, the term "organic acid of phosphorus" refers exclusively to those acids of phosphorus in which an organic radical, such as a hydrocarbon radical, is directly linked to the phosphorus atom by a carbon-to-phosphorus bond.

According to the present invention, there is provided a particular and novel group or class of olefinically unsaturated compounds of organic acids of phosphorus, which have been found readily to undergo polymerization resulting in the formation of superior new polymers having unexpectedly desirable and useful characteristics.

The new compounds provided by the invention are esters of beta,gamma-olefinically unsaturated alcohols and phosphinic acids, in which esters the unsaturation in the ester group, or alcohol residue, constitutes the only aliphatic carbon-to-carbon unsaturation in the molecule. The preferred compounds of the invention may be described as esters of beta,gamma-olefinically unsaturated alcohols containing but the one unsaturated aliphatic carbon-to-carbon linkage, with phosphinic acids in which the radical or radicals directly bonded to the phosphorus atom by a phosphorus-to-carbon bond contain carbon-to-carbon bonds of only the saturated aliphatic and/or the aromatic types.

The phosphinic acids, as the term is used herein, fall into either one of two general types that are differentiated from each other according to the substitution on the phosphorus atom. In the first of these two types there is directly bonded to the phosphorus atom one organic group by a carbon-to-phosphorus bond and one atom of hydrogen, in addition to the acidic hydroxyl or thiol group and the divalent atom of oxygen or sulfur. The type formula of these monosubstituted phosphinic acids may be written as follows:

(I) 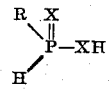

in which X is oxygen or sulfur and R is an organic radical the first atom of which is carbon. The di-substituted phosphinic acids, on the other hand, have two organic radicals directly attached to the phosphorus atom by carbon-to-phosphorus bonds and conform to the type formula (II) 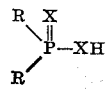

in which R and X are as above. In these di-substituted phosphinic acids the organic radicals represented by R may be the same or different. Together the phosphinic acids of Formulas I and II may be represented by the formula $R^aR^bP(=X)XH$ wherein $R^a$ represents an organic radical bonded to the phosphorus atom by a carbon-to-phosphorus bond, $R^b$ represents a member of the group consisting of a hydrogen atom and an organic radical bonded to the phosphorus atom by a carbon-to-phosphorus bond, and each X represents one of the class consisting of oxygen and sulfur.

In the esters provided by the present invention the hydrogen atom of the group —XH in the foregoing formulas is replaced by the residue of a beta,gamma-olefinically unsaturated alcohol and the organic radicals represented by R are devoid of aliphatic (including cycloaliphatic) carbon-to-carbon unsaturation. The organic radicals represented by R thus contain only either saturated aliphatic (or cycloaliphatic) carbon-to-carbon bonds, aromatic carbon-to-carbon bonds, or (in the event the radical represented by R contains but one carbon atom) no carbon-to-carbon bonds.

Although the present invention is generic to esters of the hereinbefore and hereinafter defined type wherein the phosphinic acid residue may be either mono-substituted or di-substituted, the preferred and most desirable esters of the invention are those in which the phosphinic acid residue is the residue of a di-substituted phosphinic acid. The esters of this preferred type have structures corresponding to the formula (III) 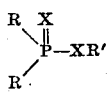

in which each R represents an organic group that is bonded to the phosphorus atom by a carbon-to-phosphorus bond and R' represents the residue of a beta,gamma-olefinically unsaturated alcohol. The esters of this preferred type have been indicated to be distinguishable from the less preferred esters of monosubstituted phosphinic acids that are represented by the formula (IV) 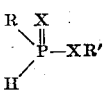

R,R', and X being as defined above, in that the esters of the preferred type, when polymerized, are better adapted to the preparation of structurally homogeneous polymers than are the esters of the less preferred type. Homopolymerization of the esters represented by Formula III is thought to occur exclusively by ethylenic polymerization and the homopolymers are thought to contain only a specie or a mixture of species representable by the structural formula

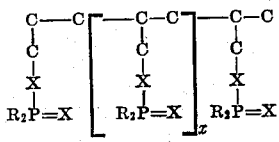

in which $x$ is a whole number. On the other hand, the polymerization of the esters of monosubstituted phosphinic acids represented by Formula IV is thought to occur either by ethylenic polymerization or by a mechanism involving phosphorus-to-carbon bonding that results in the formation of homopolymers having, or at least containing, the structure representable by the formula

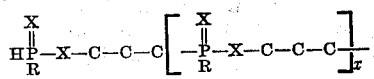

$x$ again being a small whole number, as well as the structure representable by the formula

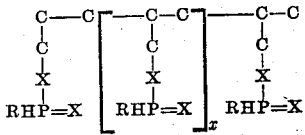

The new esters that are provided by the present invention may be prepared (1) by direct esterification of the phosphinic acid corresponding to the desired ester with the appropriate beta,gamma-olefinically unsaturated alcohol, (2) by reacting the appropriate phosphinic acid halide, e. g., chloride, with the beta,gamma-olefinically unsaturated alcohol in the presence of a base or with an alkali metal alcoholate of the beta,gamma-olefinically unsaturated alcohol, or (3) by reacting an ester of a beta,gamma-olefinically unsaturated alcohol and a saturated aliphatic or cycloaliphatic, or an aromatic phosphonous acid with an organic halide in which the halogen atom, e. g., chlorine or bromine, is attached to an alkyl, aryl, cycloalkyl, or substituted alkyl, aryl or cycloalkyl radical. The choice of the method that will be used in any given case will be governed in part by the availability of the necessary reactants and by the yields that are obtainable, as well as by other possible considerations.

The direct esterification of the appropriate phosphinic acid may be carried out by heating the phosphinic acid in liquid phase with an excess of the alcohol at a temperature of from about 50° C. to 100° C., in the presence of a catalyst, if desired, such as sulfuric acid, phosphoric acid, p-toluene sulfonic acid or other strong, non-volatile acid, present in amounts up to about 5% by weight. Water formed in the esterification reaction may be removed in the usual manner by adding a volatile solvent, such as benzene or toluene, that forms an azeotropic mixture with water, and distilling the aqueous azeotropic mixture from the reaction mixture during the reaction, the heating and removal of water generally being continued until the esterification reaction has been brought substantially to completion.

For the preparation of the esters of the invention from the corresponding phosphinic acid halides the beta,gamma-olefinically unsaturated alcohol and the phosphinic acid halide are mixed and reacted in the presence of an added base, such as sodium hydroxide, pyridine or lime, present in amounts sufficient to absorb or neutralize the hydrogen halide liberated in or by the reaction, e. g., in amounts stoichiometrically equivalent to the phosphinic acid halide. According to a modification of this method, an alkali metal alcoholate of the beta,gamma-olefinically unsaturated alcohol, such as the potassium or sodium derivative, may be substituted in the stoichiometrically required amount for the alcohol and base. In either case, the reaction is preferably conducted in the presence of an excess of the beta,gamma-olefinically unsaturated alcohol. The reaction preferably is commenced at relatively low temperatures, e. g., below about 20° C. The reaction may be brought to completion by heating, if desired, the mixture to higher temperatures, say to temperatures up to about 90° C. The desired ester in most cases is recovered by distilling the reaction mixture preferably under anhydrous conditions in the presence of a small amount of free base. Other appropriate methods can be used, when desired, for recovering the desired product, such as crystallization, extraction, etc.

For the preparation of the unsaturated phosphinates of the invention by reaction between an unsaturated ester of a phosphonous acid and an organic halide, the selected reactants are heated together, at temperatures generally within the range of from about 80° C. to about 175° C. until the reaction has gone substantially to completion, and the resulting mixture is fractionally distilled to recover the desired phosphinate. The phosphonous acid ester and the organic halide may be used in amounts corresponding to mole ratios from about 5:1 to about 1:5, although larger or smaller amounts of either reactant may be employed if desired. The reaction mixture conveniently is heated in a suitable vessel equipped with a reflux condenser, with reflux condensation. The pressure, with which the boiling point of the mixture will vary, may be atmospheric, subatmospheric or superatmospheric, as desired. The reaction time may be varied as required, for example, from one hour, more or less, up to 30 hours or more. As the reaction between the phosphonous acid ester and the organic halide progresses the boiling point, refractive index, etc. of the mixture change. When the boiling point or refractive index of the mixture reach a substantially constant value, the reaction may be considered to be substantially complete and the mixture fractionally distilled to recover the desired phosphinic acid ester. Esters of beta,-gamma-olefinically unsaturated alcohols with phosphonous acids, which esters can be employed in accordance with this method to prepare phosphinic acid esters of the present invention, are described and claimed in the copending application of the same assignee, Serial No. 198,046, filed November 28, 1950, and include, among others, diallyl benzenephosphonite, dimethallyl p-isopropylbenzenephosphonite, bis(methylisobutenyl-carbinyl) 2,4,6-trimethylbenzenephosphonite, diallyl isopentanephosphonite, diallyl p-chlorobenzenephosphonite, and others.

Representative beta,gamma-olefinically unsaturated alcohols which may be employed (either as such or as an alkali metal alcoholate, depending upon the method used) in the preparation of the phosphinates of the present invention by reaction with a phosphinic acid or phosphinic acid halide include, among others, allyl alcohol, methallyl alcohol, crotyl alcohol, ethyl vinyl carbinol, methyl propenyl carbinol, dipropenyl carbinol, 3-methyl-2-penten-4-ol, 3-methyl-2-hexen-4-ol, methyl isobutenyl carbinol, 2-ethyl-2-propen-1-ol, 3-chloroallyl alcohol, 2-chloroallyl alcohol, 3-methoxyallyl alcohol, 2-cyclohexenol and 3-phenylallyl alcohol. A preferred group of esters of the invention comprises those phosphinates in which the alcohol residue contains an unsubstituted methylidene group ($CH_2=$) directly linked to the carbon atom in the No. 2 position of the alcohol residue. The preferred alcohols of this type, in which preferred alcohols only hydrogen atoms or alkyl groups are substituted on the carbon atoms in positions Nos. 1 and 2, may be conveniently referred to as the 2-methylidene alkanols and may be represented by the formula

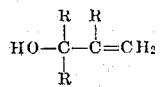

in which each R represents a hydrogen atom or a lower alkyl group.

In the phosphinates of the invention the organic radical or radicals bonded to the phosphorus atom by a carbon-to-phosphorus bond may be alkyl, aryl, cycloalkyl or substituted alkyl, aryl or cycloalkyl, such as methyl, ethyl, propyl, isopropyl, butyl, isobutyl, s-butyl, t-butyl, the pentyls, the hexyls, the heptyls, the nonyls, the decyls, dodecyl, tetradecyl, hexadecyl, octadecyl, phenyl, naphthyl, tolyl, xylyl, cyclohexyl, cyclopentyl, phenethyl, chlorophenyl, etc. Those esters in which the organic group or groups bonded by a phosphorus atom of phosphorus-to-carbon bonds contain a total of not more than about 20 carbon atoms in each group are generally the most economically prepared and hence will be the one most frequently used in polymers of the invention.

The following examples will serve to illustrate the novel esters provided by the invention:

*Example I.—Allyl octanephosphinate*

Allyl octanephosphinate is prepared by mixing 0.25 mole of octanephosphinic acid, 2.0 moles of allyl alcohol and about 1.3% by weight of p-toluenesulfonic acid and heating the mixture to the boiling point in the presence of added toluene for about 24 hours under a reflux condenser equipped with a phase separating head, water being withdrawn at the column head and separated toluene returned to the flask continuously. The allyl octanephosphinate is isolated by fractional distillation of the reaction mixture, as a water-white mobile liquid. The allyl octanephosphinate is found to have a boiling point 134° C. under 1 mm. mercury pressure and a refractive index (20/D) of 1.4536. The ester is found to have a molecular weight of 222 compared to the calculated value of 225 and to contain 14.0% phosphorus compared to the theoretical content of 13.8%.

*Example II.—Crotyl cyclohexane(butane)-phosphinate*

Crotyl cyclohexane(butane)phosphinate is prepared by heating under reflux in the presence of benzene in accordance with the method illustrated in Example I a mixture of 0.5 mole of cyclohexane(butane)phosphinic acid, 1.5 moles of crotyl alcohol and about 1.5% by weight, based upon the alcohol and phosphinic acid, of benzenesulfonic acid. Crotyl cyclohexane(butane)phosphinate, having the structural formula

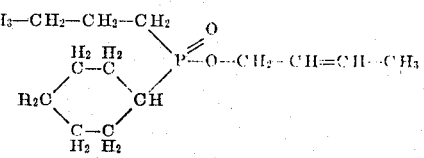

is recovered from the mixture by fractional distillation.

*Example III.—Allyl dibutanephosphinate*

In this example, allyl dibutanephosphinate is prepared by converting dibutanephosphinic acid to the acid chloride and treating the acid chloride with sodium allyloxide. A solution of 91 grams of dibutanephosphinic acid in 150 cc. of benzene is warmed to 40° C. and to this is slowly added 110 grams of phosphorus pentachloride. When the addition is complete benzene and phosphorus oxychloride are removed by flash distillation and the residue is distilled from a Claisen flask, yielding 91 grams of dibutanephosphinic chloride; boiling point 90° C. under 0.4 mm. mercury pressure. Allyl dibutanephosphinate is prepared by dissolving 8.0 grams of sodium in 174 grams of allyl alcohol and slowly adding to the resulting solution, with cooling to 0.5° C., 67 grams of the dibutanephosphinic chloride. The mixture then is heated at 55° C. for one-half hour, filtered, and fractionally distilled. Allyl dibutanephosphinate is recovered as a water-white odorless liquid boiling at 95° C. under 1.0 mm. mercury pressure. The pour point of the allyl dibutane phosphinate was determined and is found to be below —65° F. The structure of allyl dibutanephosphinate is

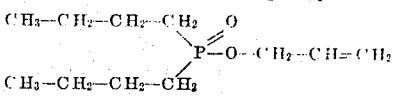

*Example IV.—Allyl benzene(butane) phosphinate*

Allyl benzene(butane)phosphinate is prepared by reaction between diallyl benzenephosphonite and butyl bromide according to the following equation:

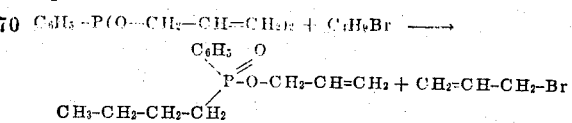

In a flask equipped with a reflux condenser there are placed 201 grams of diallyl benzenephosphonite and there are added 222 grams of butyl bromide. The solution is refluxed for 20 hours and then fractionally distilled. There are recovered 178 grams of allyl benzene(butane)phosphinate as a water-white clear liquid having a boiling point of 113° C. under 0.15 mm. mercury pressure. Analysis: Percent calculated, 13.0; found, 13.1.

*Example V.—Allyl Bis(2-ethylhexane)-phosphinate*

Bis(2-ethylhexane)phosphinic acid chloride is prepared by treatment of bis(2-ethylhexane)-phosphinic acid with phosphorus pentachloride in the manner described in Example III and the acid chloride is recovered by fractional distillation. For the preparation of the allyl ester, 463 grams of bis(2-ethylhexane)phosphinic chloride is added at 0° C. to 3°C. to a solution prepared by dissolving 74 grams of sodium in 1740 grams allyl alcohol. After heating the resulting mixture at 50° C. to 60° C. for 2 hours the allyl alcohol is flashed off, 700 cc. of benzene are added and the solution is washed with water. From the washed solution there is recovered, by distillation in the presence of a small amount of added sodium hydroxide, 303 grams of allyl bis(2-ethylhexane)phosphinate as a clear mobile liquid having a boiling point of 134° C. at 0.5 mm. mercury pressure.

*Example VI.—Allyl benzenephosphinate*

Allyl benzenephosphinate is prepared by mixing 2 moles of allyl alcohol, 1 mole of dry pyridine, and 1 mole of benzene phosphonous dichloride in anhydrous diethyl ether and after completion of the ensuing reaction filtering off precipitated pyridine hydrochloride and fractionally distilling the filtrate. The allyl benzenephosphinate is found to have a boiling point of 121° C. to 123° C. under 1.5 millimeters mercury pressure. The molecular weight is found to be 190, compared to the theoretical value of 182.

By the methods illustrated in the foregoing examples there can be prepared other esters of phosphinic acids with beta,gamma-olefinically unsaturated alcohols. Representative of such other esters are the following: the esters of beta,-gamma-olefinically unsaturated alcohols with dialkanephosphinic acids, such as allyl dinonanephosphinate, methallyl octane(hexane)phosphinate, dimethylisopropenylcarbinyl dodecane-(2-ethylhexane)phosphinate, methallyl butane-(methane)phosphinate, allyl ethane(butane)-phosphinate, and 2-cyclohexenyl dioctanephosphinate; the esters of alpha,beta-olefinically unsaturated alcohols with cycloaliphatic phosphinic acids, such as allyl cyclohexane(butane)phosphinate, allyl dicyclohexanephosphinate, 3-phenylallyl cyclohexane(dodecane)-phosphinate, and allyl cyclohexane(isopropane)phosphinate; and esters of beta,gamma-olefinically unsaturated alcohols with aromatic phosphinic acids, such as allyl butane(benzene)phosphinate, methallyl dibenzenephosphinate, and methylisobutenylcarbinyl benzene(cyclohexane)phosphinate. Representative esters of beta,gamma-olefinically unsaturated alcohols and monosubstituted phosphinic acids are allyl octanephosphinate, crotyl butanephosphinate, tiglyl cyclohexanephosphinate, allyl decanephosphinate, allyl 3-hydroxypropanephosphinate, methallyl 3-acetyloxypropanephosphinate, crotyl 2-acetylethanephosphinate, methallyl 3-chloropropanephosphinate, allyl 3-methoxypropanephosphinate, and methallyl 3-methylmercaptopropanephosphinate.

The phosphinic acid esters of beta,gamma-olefinically unsaturated alcohols provided by the present invention find particular utility as intermediates to be used in and for the preparation of new and useful phosphorus-containing polymers. By the unqualified term "polymers" it is intended to include both the homopolymers of the new esters, as well as the copolymers of the new esters with other polymerizable ethylenically unsaturated compounds. The polymers provided by the present invention are prepared by polymerizing, alone or conjointly with other polymerizable ethylenically unsaturated compounds, the beta,gamma-olefinically unsaturated esters of phosphinic acids of the hereindescribed class. The polymerization may be carried out with the aid of heat or light alone, or with the aid of both heat and light. Preferably the polymerization is conducted in the presence of an added polymerization catalyst. As the polymerization catalyst there advantageously is used any one or more of the customary peroxidic polymerization catalysts, that is, any compound containing two directly interconnected atoms of oxygen. Such compounds include, for example, molecular oxygen, ozone, inorganic peroxides, such as hydrogen peroxide, barium peroxide, etc., and organic peroxides, such as diacetyl peroxide, dibenzoyl peroxide, di-tertiary-butyl peroxide, tertiary-butyl hydroperoxide, tertiary-butyl perbenzoate, di-tertiary-butyl dipersuccinate, and di-tertiary-butyl diperphthalate. The polymerization catalyst preferably is employed in only minor amounts, amounts from about 0.1% to about 5% of the monomers or polymers to be polymerized being generally satisfactory. More than one polymerization catalyst may be used, and if more than one is used they may be used simultaneously or successively. The polymerization may be carried out in mass or bulk, with the monomer or monomers dissolved in an organic solvent, or in an emulsion or suspension of the monomer or monomers, or an organic solvent solution thereof, in an aqueous medium. The polymerization may be continued in one stage until the desired polymer is obtained or it may be interrupted at one or more intermediate degrees of polymerization and the polymerization subsequently completed at either the same or at a different site.

The polymerization may be carried out at any suitable temperature depending, inter alia, upon the particular monomer or monomers involved and upon the polymerization catalyst that is used. Generally speaking, temperatures within the range of 40° C. to about 200° C. are employed. When a peroxidic catalyst is used the polymerization temperature will be substantially the decomposition temperature of the peroxide. Thus, with dibenzoyl peroxide the preferred temperature is about 65° C. to 85° C., while with di-tertiary-butyl peroxide, the polymerization temperature generally would be above about 110° C. Compounds that are copolymerizable with the phosphinic acid esters of the present invention contain the vinylidene group ($CH_2=C<$), preferably the vinyl group ($CH_2=CH-$). Depending upon the desired properties of the copolymer, the co-monomer may contain but the one ethylenic linkage or it may contain a plurality of ethylenic linkages, the preferred copolymers being obtained by copolymerization of the esters of beta,gamma-olefinically unsaturated alcohols and phosphinic acids with mono-ethylenically unsaturated compounds copolymerizable therewith. Representative polymerizable ethylenically unsaturated compounds which may be employed in the preparation of such copolymers include, for example, vinyl halides such as vinyl chloride, vinylidene chloride, etc.; vinyl esters of carboxylic acids, e. g., vinyl acetate, vinyl butyrate, and vinyl p-tertiary-butylbenzoate; allyl esters, such as allyl acetate, diallyl phthalate, allyl crotonate; esters, nitriles and amides of acrylic and substituted acrylic acids, such as methyl acrylate, ethyl chloroacrylate, methyl methacrylate, acrylonitrile, methacrylonitrile, methacrylamide, and the like. Polymers ranging from mobile liquids to soft to hard solids may be prepared depending upon the conditions under which the polymerization is carried out, the extent of polymerization and the kind and amount of any co-monomer conjointly polymerized with the unsaturated phosphinate. In the preparation of copolymers, the mixture of polymerizable monomers may contain from as much as 98% to as little as 5% of the phosphinic acid ester of a beta, gamma-olefinically unsaturated alcohol. The preferred copolymers contain a major amount on a weight basis of residues of the beta,gamma-olefinically unsaturated phosphinic acid ester combined in the molecule.

The polymers of the invention are of interest, depending upon their specific properties, as materials useful in the impregnation or lamination of fabrics such as textile fabrics, felt, wood, paper and the like. They may be added to lubricants, such as mineral oils or synthetic lubricants, alone or in conjunction with other additives, to modify the properties of such lubricants. Hard, solid resins produced in accordance with the invention may be employed as materials of construction and for this use they may have incorporated therewith fillers, pigments, and the like.

The polymers of the invention can be stabilized against further polymerization by treatment with molecular hydrogen in the presence of a hydrogenation catalyst, to effect saturation with hydrogen of residual olefinic linkages that are present in the polymer molecule. As the hydrogenation catalyst, any hydrogenation catalyst may be used, such as a nickel catalyst, a copper catalyst, a cobalt catalyst, or a compound catalyst, such as copper chromite. Noble metal catalysts, e. g., palladium or platinum, may also be used, although their use may be less desirable because of their generally higher cost. The hydrogenation, which may be carried out in the presence of an organic solvent, such as a hydrocarbon or an alcohol, if desired, proceeds satisfactorily at temperatures within the range of from about 40° C. to 250° C. and under hydrogen pressures from 400 pounds per square inch gauge up to 3000 or more pounds per square inch gauge. After the hydrogenation, the hydrogenated polymer can be recovered by removing the catalyst by filtration or equivalent means. Lower-boiling materials, e. g., solvent (if one was used) and monomeric or lower-boiling polymers, may be removed, if desired, by subjecting the products of the hydrogenation to a topping or other treatment for separation, either in whole or in part, of low-boiling constituents.

Because of their desirable viscosity characteristics, their low pour points and their low corrosivity particularly towards iron and aluminum, the liquid hydrogenated polymers of the invention are of particular interest as hydraulic fluids to be used, for example, in hydraulic systems for remote control in airplanes, ships and automobiles, and as lubricants to be used in special applications. The liquid polymer composition may have incorporated therein additives to modify the viscosity characteristics, to provide or enhance detergency, to increase resistance to oxidation, to decrease any possible corrosivity towards metals with which they may be brought into contact, or otherwise to modify the properties thereof.

The following examples will serve to illustrate the preparation of selected homopolymers and copolymers of the invention.

*Example VII.—Homopolymeric allyl bis(2-ethylhexane) phosphinate*

Into a reaction vessel is charged 150 grams of allyl bis(2-ethylhexane) phosphinate prepared as in Example V and 0.45 gram of di-tertiary-butyl peroxide. The solution is heated at 175° C. for 5 hours. During the heating additional 0.45 gram portions of di-tertiary-butyl peroxide are added at hourly intervals and the refractive index is determined. As the heating progresses the refractive index of the solution increases as shown in the following table:

| Heating Time, Hours | Refractive Index (n 20/D) | Percent w. Peroxide Added |
|---|---|---|
| 0 | 1.4596 | 0.3 |
| 1 | 1.4625 | 0.3 |
| 2 | 1.4659 | 0.3 |
| 3 | 1.4683 | 0.3 |
| 4 | 1.4710 | 0.3 |
| 5 | 1.4725 | |

The polymer is a light yellow viscous oil.

*Example VIII.—Homopolymeric allyl octanephosphinate*

Poly(allyl octanephosphinate) is prepared by heating at a temperature of 120° C. for 60 hours a solution consisting of 10 grams of allyl octanephosphinate and 1 per cent by weight of di-tertiary-butyl peroxide. The polymer is isolated by distilling off the more volatile components of the reaction products.

*Example IX.—Homopolymeric allyl dibutanephosphinate*

A 209 gram sample of allyl dibutanephosphinate prepared as in Example III is heated to 50° C. for 7 days and a total of 5 grams of dibenzoyl peroxide are added in 0.5 gram portions at intervals. During this time the refractive index rises from 1.4539 to 1.4700. The resulting mixture is heated at 149° C. under 0.5 mm. mercury pressure to remove unchanged monomer. The remaining polymer is dissolved in benzene and the solution washed with dilute aqueous alkali solution to remove benzoic acid formed by decomposition of the benzoyl peroxide. The solution then is treated with decolorizing charcoal, filtered and the benzene removed by distillation. The viscosity index of the polymer is found to be 115 (Dean and Davis) compared to a viscosity index of 5 for the monomer. The viscosity of the polymer at 100° F. is found to be 33,950 centistokes. The average molecular weight of the polymer is found to be about 10 times that of the monomer.

*Example X.—Homopolymeric allyl benzene(butane)phosphinate*

To 125 parts by weight of allyl benzene(butane)phosphinate, prepared as in Example IV, there are added 2.2 parts by weight of di-tertiary-butyl peroxide and the mixture is heated at 180° C. for 5 hours. The resulting mixture is subjected to a topping operation to distill off unchanged monomer, leaving 117 parts by weight of a viscous clear oil, representing a 93% yield of polymer.

*Example XI.—Homopolymeric allyl benzenephosphinate*

To 200 parts of allyl benzenephosphinate there are added 4 parts by weight of di-tertiary-butyl peroxide and the mixture is heated at 120° C. for 16 hours. The resulting homopolymer is a very viscous, water-white oil.

*Example XII.—Copolymer of diallyl phthalate and allyl octanephosphinate*

A copolymer of diallyl phthalate and allyl octanephosphinate is prepared by heating at a temperature of 150° C. for 24 hours a solution consisting of 8 grams of diallyl phthalate, 8 grams of allyl octanephosphinate and 3½ per cent by weight (based upon the total weight of esters) of di-tertiary-butyl peroxide. The polymer is obtained as a slightly plastic, colorless solid.

*Example XIII.—Copolymer of allyl acetate and allyl cyclohexane(butane)phosphinate*

A copolymer of allyl acetate and allyl cyclohexane(butane)phosphinate is prepared by heating to a temperature of 120° C. for 24 hours a solution consisting of 5 grams of allyl acetate, 10 grams of allyl cyclohexane(butane)phosphinate and 2 per cent by weight of di-tertiary-butyl peroxide. The polymer is isolated by distilling off the volatile components of the reaction products.

*Example XIV.—Hydrogenated homopolymer of allyl bis(2-ethylhexane)phosphinate*

To an autoclave there are charged 132 grams of the polymer prepared in Example VI, and about 10 grams of Raney nickel catalyst. Hydrogen is introduced into the autoclave under a pressure of 1200 pounds per square inch gauge and the autoclave is heated to 120° C. until absorption of hydrogen ceases, additional hydrogen being added as required to maintain the pressure. The autoclave then is cooled, the mixture withdrawn and filtered, and the filtrate is washed successively with 5 per cent aqueous hydrochloric acid and with 5 per cent aqueous sodium hydroxide solution, to remove traces of dissolved nickel. Low boiling materials are distilled off at 100° C. under 1 to 2 mm. mercury pressure, leaving 103 grams of a light yellow oil. The hydrogenated polymer is found to have a viscosity corresponding to an S. A. E. 60 lubricating oil with a viscosity index of 117.

*Example XV.—Hydrogenated homopolymer of allyl benzene(butane)phosphinate*

The homopolymer of allyl benzene(butane)phosphinate described in Example IX is hydrogenated over Raney nickel catalyst in the manner described in the preceding example. Low boiling materials are removed from the purified polymer by heating at 175° C. under one mm. mercury pressure. The resulting polymer-monomer mixture is found to have a viscosity equivalent to that of an S. A. E. 20 lubricating oil with a viscosity index of 61.

This application is a continuation-in-part of application Serial No. 119,217, filed October 1, 1949.

We claim as our invention:
1. Allyl octanephosphinate.
2. Allyl bis(2-ethylhexane)phosphinate.
3. Allyl benzene(butane)phosphinate.
4. An allyl monoalkanephosphinate.
5. An allyl dialkanephosphinate.
6. The ester of a beta,gamma-olefinically unsaturated alcohol and a phosphinic acid, the phosphinic acid having the structure represented by $R^aR^bP(=X)XH$ wherein $R^a$ represents an organic radical bonded to the phosphorus atom by a carbon-to-phosphorus bond, $R^b$ represents a member of the group consisting of a hydrogen atom and an organic radical bonded to the phosphorus atom by a carbon-to-phosphorus bond, and each X represents one of the class consisting of oxygen and sulfur the olefinic unsaturation of the alcohol residue being the only aliphatic carbon-to-carbon unsaturation in the molecule.
7. Polymeric allyl bis(2-ethylhexane)phosphinate.
8. Homopolymeric allyl bis(2-ethylhexane)phosphinate.
9. A polymeric allyl dialkanephosphinate.
10. A polymeric allyl benzene(butane)phosphinate.
11. A polymer of an ester of a beta,gamma-olefinically unsaturated alcohol and a dihydrocarbon phosphinic acid, in said ester the olefinic unsaturation in the alcohol residue being the only aliphatic carbon-to-carbon unsaturation in the molecule.
12. A homopolymer of an ester of a beta,gamma-olefinically unsaturated alcohol and a phosphinic acid, the phosphinic acid having the structure represented by $R^aR^bP(=X)XH$ wherein $R^a$ represents an organic radical bonded to the phosphorus atom by a carbon-to-phosphorus bond, $R^b$ represents a member of the group consisting of a hydrogen atom and an organic radical bonded to the phosphorus atom by a carbon-to-phosphorus bond, and each X represents one of the class consisting of oxygen and sulfur in said ester the olefinic unsaturation in the alcohol residue being the only aliphatic carbon-to-carbon unsaturation in the molecule.
13. A copolymer of (1) an ester of a beta-gamma-olefinically unsaturated alcohol and a phosphinic acid, the phosphinic acid having the structure represented by $R^aR^bP(=)XH$ wherein $R^a$ represents an organic radical bonded to the phosphorus atom by a carbon-to-phosphorus bond, $R^b$ represents a member of the group consisting of a hydrogen atom and an organic radical bonded to the phosphorus atom by a carbon-to-phosphorus bond, and each X represents one of the class consisting of oxygen and sulfur in said ester the olefinic unsaturation in the alcohol residue being the only aliphatic carbon-to-carbon unsaturation in the molecule, and (2) a polymerizable ethylenically unsaturated compound.
14. Hydrogenated polymeric allyl bis(2-ethylhexane)phosphinate.
15. A hydrogenated homopolymeric allyl dialkanephosphinate.
16. A hydrogenated polymeric ester of a beta,-gamma-olefinically unsaturated alcohol and a phosphinic acid, the phosphinic acid having the structure represented by $R^aR^bP(=X)XH$ wherein $R^a$ represents an organic radical bonded to the phosphorus atom by a carbon-to-phosphorus bond, $R^b$ represents a member of the group consisting of a hydrogen atom and an organic radical bonded to the phosphorus atom by a carbon-to-phosphorus bond, and each X represents one of the class consisting of oxygen and sulfur in said monomeric ester the olefinic unsaturation in the alcohol residue being the only aliphatic carbon-to-carbon unsaturation in the molecule.

DENHAM HARMAN.
ALAN R. STILES.

References Cited in the file of this patent

UNITED STATES PATENTS

| Number | Name | Date |
|---|---|---|
| 2,425,766 | Fon Toy | Aug. 19, 1947 |
| 2,557,805 | Upson | June 19, 1951 |

OTHER REFERENCES

Plets: J. Gen. Chem. (U. S. S. R.), vol. 6, 1198–1202 (1936) Abstracted in C A. 31, 1355–1356 (1937).